US009954462B2

(12) United States Patent
Chapman et al.

(10) Patent No.: US 9,954,462 B2
(45) Date of Patent: Apr. 24, 2018

(54) CONVERTER TOPOLOGIES AND CONTROL

(71) Applicant: SunPower Corporation, San Jose, CA (US)

(72) Inventors: Patrick L Chapman, Austin, TX (US); Jonathan List Ehlmann, Austin, TX (US); Fernando Rodriguez, Austin, TX (US)

(73) Assignee: SunPower Corporation, San Jose, CA (US)

( * ) Notice: Subject to any disclaimer, the term of this patent is extended or adjusted under 35 U.S.C. 154(b) by 0 days.

(21) Appl. No.: 15/199,239

(22) Filed: Jun. 30, 2016

(65) Prior Publication Data

US 2018/0006575 A1    Jan. 4, 2018

(51) Int. Cl.
*H02M 5/458* (2006.01)
*H02M 7/48* (2007.01)
*H02M 1/15* (2006.01)
*H02M 7/5387* (2007.01)

(52) U.S. Cl.
CPC ........... *H02M 7/4807* (2013.01); *H02M 1/15* (2013.01); *H02M 5/458* (2013.01); *H02M 7/5387* (2013.01)

(58) Field of Classification Search
None
See application file for complete search history.

(56) References Cited

U.S. PATENT DOCUMENTS

| 5,140,201 | A | 8/1992 | Uenishi |
| 5,198,970 | A | 3/1993 | Kawabata |
| 5,982,645 | A | 11/1999 | Levran |
| 6,330,170 | B1 | 12/2001 | Wang |
| 6,954,366 | B2 | 10/2005 | Lai |
| 8,279,642 | B2 | 10/2012 | Chapman et al. |
| 8,670,254 | B2 | 3/2014 | Perreault et al. |
| 2005/0116767 | A1 | 6/2005 | Cavazzoni |
| 2006/0256470 | A1 | 11/2006 | Juds et al. |
| 2008/0055954 | A1 | 3/2008 | Kajouke et al. |
| 2008/0205109 | A1* | 8/2008 | Darroman ................ B60L 7/16 363/132 |

(Continued)

FOREIGN PATENT DOCUMENTS

| JP | 07015971 A | * | 1/1995 |
| JP | 10020949 A | * | 1/1998 |
| KR | 20150041944 A | * | 4/2015 |

OTHER PUBLICATIONS

Feng Tian; "Solar-Based Single-Stage High-Efficiency Grid-Connected Inverter"; A thesis submitted in partial fultillment of the requirements for the degree of Master of Science in the Department of Electrical & Computer Engineering in the College of Engineering and Computer Science at the University of Central Florida, Orlando, Florida; Spring Term 2005; Copyright 2005 Feng Tian.

(Continued)

*Primary Examiner* — Jeffrey Gblende
(74) *Attorney, Agent, or Firm* — Grasso PLLC

(57) ABSTRACT

Systems, methods, and articles of manufacture are provided wherein inverter topologies and inverter control employ primary and secondary windings with a half-bridge circuit and an unfolding bridge circuit positioned between the second winding and an AC grid. Certain topologies may employ control circuits for controlling the bridges suitable for a phase angle of the AC grid.

20 Claims, 7 Drawing Sheets

(56) References Cited

U.S. PATENT DOCUMENTS

| | | | |
|---|---|---|---|
| 2010/0201338 A1* | 8/2010 | Haj-Maharsi | H02M 1/4233 |
| | | | 323/305 |
| 2011/0026282 A1* | 2/2011 | Chapman | H02J 3/38 |
| | | | 363/65 |
| 2011/0181128 A1 | 7/2011 | Perrault et al. | |
| 2012/0081933 A1 | 4/2012 | Garrity | |
| 2012/0098344 A1 | 4/2012 | Bergveld et al. | |
| 2012/0268969 A1 | 10/2012 | Cuk | |
| 2014/0268908 A1 | 3/2014 | Zhou et al. | |
| 2014/0300206 A1 | 10/2014 | Moes et al. | |
| 2015/0049525 A1 | 2/2015 | Mu et al. | |
| 2015/0098251 A1* | 4/2015 | Harrison | H02J 3/383 |
| | | | 363/17 |
| 2016/0268917 A1* | 9/2016 | Ramsay | H02M 5/458 |
| 2016/0285387 A1 | 9/2016 | Rodriguez | |
| 2016/0285390 A1 | 9/2016 | Rodriguez | |

OTHER PUBLICATIONS

ISR and WO PCT Patent Application PCT/US2017/039195.
International Search Report and Written Opinion for International Application No. PCT/US2016/024024, dated Jun. 24, 2016 15 Pages.
International Search Report and Written Opinion for International Application No. PCT/US2016/024026, dated Jun. 24, 2016.
Krishnaswami et al, "Three Port Series-Resonant DC-DC Converter to Interface Renewable Energy Sources With Bidirectional Load and Energy Storage Ports" IEEE Transactions on Power Electronics, vol. 24, No. 10, Oct. 2009, pp. 2289-97.
Brandon J. Pierquet, "Designs for Ultra-High Efficiency Grid-Connected Power Conversion" Massachussetts Institute of Technology, Thesis, Jun. 2001, 215 pages.

* cited by examiner

CONVERTER TOPOLOGIES AND CONTROL

CROSS-REFERENCE TO COMMONLY-OWNED CO-PENDING U.S. PATENT APPLICATIONS

The present application is related to commonly-owned co-pending U.S. patent application Ser. No. 15/080,110 entitled "DC-TO-AC INVERTER TOPOLOGIES" by Fernando Rodriguez, Hengsi Qin and Patrick Chapman, which was filed on Mar. 24, 2016 and claims priority under 35 U.S.C. § 119(e) to U.S. Provisional Patent Application Ser. No. 62/138,184, entitled "DC-TO-AC INVERTER TOPOLOGIES" by Patrick Chapman, which was filed on Mar. 25, 2015. The entirety of both applications are hereby fully incorporated, into this application, by reference.

TECHNICAL FIELD

The present disclosure relates, generally, to power converters for converting direct current (DC) power to alternating current (AC) power and, more particularly, to converter topologies and control techniques.

BACKGROUND

Power inverters convert a DC power to an AC power. For example, some power inverters are configured to convert a DC power to an AC power suitable for supplying energy to an AC grid and, in some cases, an AC load that may or may not be coupled to the AC grid. One particular application for such power inverters is the conversion of DC power generated by an alternative energy source, such as photovoltaic cells ("PV cells" or "solar cells"); fuel cells; DC wind turbines; DC water turbines; and other DC power sources, to a single-phase AC power for delivery to the AC grid at the grid frequency. The amount of power that can be delivered by certain alternative energy sources, such as PV cells, may vary in magnitude over time due to temporal variations in operating conditions. For example, the output of a typical PV cell will vary as a function of variations in sunlight intensity, angle of incidence of sunlight, ambient temperature and other factors.

In a typical photovoltaic power system, an inverter may be associated with one or more solar cell panels. For example, some systems include strings of solar cell panels that deliver a relatively high, combined voltage (e.g., nominal 450 V) to a single, large inverter. Alternatively, in other systems such as a distributed photovoltaic power system, an inverter may be associated with each solar cell panel. In such systems, the solar cell panels are typically small with relatively low voltage (e.g., 25 V). The inverter may be placed in close proximity to the associated solar cell panel to increase the conversion efficiency of the overall system.

DETAILED DESCRIPTION

Figure 1:
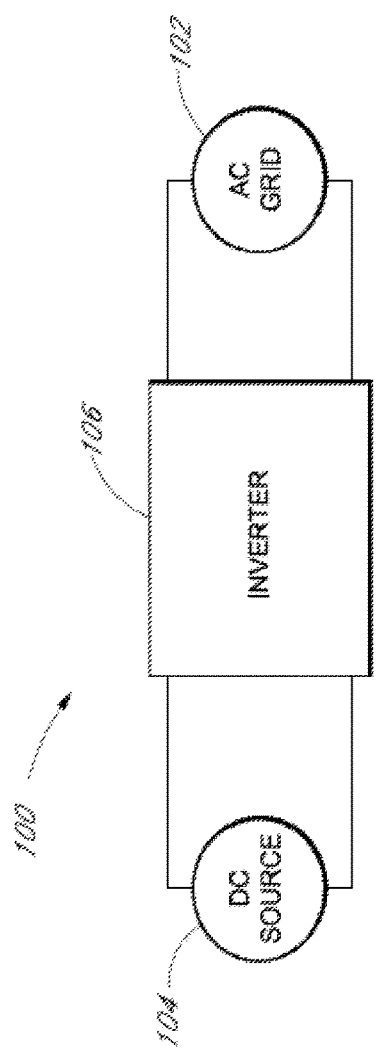
FIG. 1 is a simplified block diagram as may be employed in embodiments of a system for converting DC power to AC power.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure, or portions thereof, may be implemented in hardware, firmware, software, or any combination thereof. Embodiments of the disclosure may also be implemented as instructions stored on a tangible, machine-readable storage medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In this description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

Embodiments may comprise a multi-port inverter for converting an input direct current (DC) waveform from a DC source to an output alternating current (AC) waveform for delivery to an AC grid may include a transformer that includes a first winding and at least a second winding. The inverter may further include a DC-AC inverter electrically coupled to the first winding of the transformer, an AC-AC converter electrically coupled to the second winding of the transformer, and an active filter electrically coupled to a second winding of the transformer. The DC-AC inverter may be adapted to convert the input DC waveform to an AC waveform delivered to the transformer at the first winding. The AC-AC converter may be adapted to convert an AC waveform received at the second winding of the transformer to the output AC waveform having a grid frequency of the AC grid. The active filter may be adapted to sink and source power with one or more energy storage devices based on a mismatch in power between the DC source and the AC grid.

The AC-AC converter may include a first set of electrical switches electrically coupled to a first terminal of the second winding of the transformer, a capacitor divider electrically coupled with the first set of electrical switches and to a second terminal of the second winding of the transformer, a second set of electrical switches electrically coupled to the AC grid, a first capacitor electrically coupled across the first set of electrical switches, and a resistor electrically coupled between the first capacitor and the second set of electrical switches.

Embodiments may also comprise a multi-port inverter for converting an input direct current (DC) waveform from a DC source to an output alternating current (AC) waveform for delivery to an AC grid. This topology may include an AC-AC converter electrically coupled through a transformer to a DC-AC inverter electrically coupled to the DC source adapted to convert an AC waveform received from the transformer to output the AC waveform having a grid frequency of the AC grid. The AC-AC converter may include a half-bridge circuit electrically coupled to the transformer and an unfolding bridge circuit electrically coupled between the half-bridge circuit and the AC grid. The inverter may also include a controller having a processor and a memory wherein the controller is adapted to control the switching cycles of electrical switches of the unfolding bridge circuit. These cycles may trigger the switches such that when a voltage across the AC grid is substantially positive during a first period, a first set of electrical switches is on and a second set of electrical switches is off. The cycle may also trigger the switches such that when the voltage across the AC grid is substantially negative during a second period, the first set of electrical switches is off and the second set of electrical switches is on. Still further, the cycle may also include a third period comprising a blanking time period between the first and second periods such that when the voltage across the AC grid is approximately zero, the first and second sets of electrical switches are off.

Embodiments may also further comprise a multi-port inverter topology for converting an input direct current (DC) waveform from a DC source to an output alternating current (AC) waveform for delivery to an AC grid. This topology may include a transformer that includes a first winding and at least a second winding, a DC-AC inverter electrically coupled to the first winding of the transformer adapted to convert the input DC waveform to an AC waveform delivered to the transformer at the first winding, an AC-AC converter electrically coupled to the second winding of the transformer and adapted to convert the AC waveform received at the second winding of the transformer to the output AC waveform having a grid frequency of the AC grid, an active filter electrically coupled to the at least second winding of the transformer wherein the active filter is adapted to sink and source power with one or more energy storage devices based on a mismatch in power between the DC source and the AC grid, and a controller, comprising a phase locked loop (PLL) electrically coupled to receive an AC voltage from the AC grid and having an output signal comprising an estimate of the phase angle of the AC voltage, wherein the controller, in response to the estimated phase angle of the AC voltage, controls the switching cycles of a plurality of electrical switches of the AC-AC converter. The AC-AC converter may include a half-bridge circuit electrically coupled to the first winding of the transformer and an unfolding bridge circuit electrically coupled between the half-bridge circuit and the AC grid.

In the aforementioned commonly-owned application, U.S. Ser. No. 15/080,110, a number of DC-AC inverter topologies are disclosed. General topologies therein comprise a multi-winding transformer, a DC-AC inverter electrically coupled between a DC source and winding of the transformer, an active filter electrically coupled to a winding of the transformer, an AC-AC cycloconverter, electrically coupled between a winding of the transformer and an AC grid, and an inverter controller electrically coupled to the DC-AC inverter, the active filter, and the cycloconverter. In embodiments described and illustrated, the cycloconverter comprises a resonant tank circuit and a circuit that resembles a half-bridge circuit. The half-bridge circuit uses two full-blocking switches that allow the voltage source, the AC grid, to be bi-polar. The full-blocking circuit of the cycloconverter comprises two common source MOSFETS, which doubles the conduction losses compared with a half-bridge circuit.

In embodiments of the present invention, the cycloconverter is replaced by an AC-AC converter comprising a half-bridge circuit and an unfolding bridge circuit. Simulations have indicated that such a topology performs as expected and generates power at a unity power factor as well as leading and lagging reactive power. Performance of the electromagnetic interference (EMI) filter in the topologies of the present inventions may be comparable to that of the EMI filter in the cycloconverter.

Compared to the cycloconverter, conduction losses may be reduced in embodiments of the AC-AC converter of the present invention. For example, for a given operating condition, both the half bridge of the present invention and the cycloconverter switch at high frequency can process current with a high RMS magnitude. However, given that the cycloconverter has four switches while the half-bridge has two switches, conduction losses may be reduced in half or by another amount.

Additionally, the gate driver power supply for the AC-AC converter of the present invention may be less complex than in topologies employing a cycloconverter. For example, cycloconverter topologies comprise two pairs of full blocking switches that require two isolated gate driver power supplies. Comparatively, in embodiments of the present invention, a half-bridge plus unfolding bridge circuitry may be provided and may require only a single non-isolated gate driver power supply.

Circuits employing the half-bridge and unfolding bridge topology of embodiments may also have reduced losses. These losses may be derived from synchronous rectification of the AC grid voltage performed by the unfolding bridge. This synchronous rectification may employ switching at 60 Hz near zero-voltage transitions. Therefore, switching loses are very low. Conduction losses may also be reduced in embodiments as current through the unfolding bridge is the average output current of the high frequency resonant half-bridge, which results in reduced conduction losses.

In embodiments, replacing the cycloconverter with the topology of the embodiments of the present invention may be substantially cost neutral. The cycloconverter requires four high performing switches, two isolated gate drivers, and two isolated gate driver power supplies. Comparatively, the AC-AC converter of the present invention comprises six switches, the half-bridge comprises two high performing switches and the unfolding bridge comprises four low to average performing switches. This AC-AC converter can require three gate drivers; however, none need to have isolation and can, therefor, all share one gate driver power supply.

Referring to FIG. 1, a system 100 for supplying alternating current (hereinafter "AC") power to an AC grid 102 at a grid frequency includes a direct current (hereinafter "DC") source 104 and an inverter 106. The DC source 104 may be embodied as any type of DC source configured to generate or produce a DC power, which is supplied to the inverter 106. For example, the DC power may be embodied as a photovoltaic solar cell or array, a fuel cell, a wind turbine configured to generate a DC power (e.g., via a rectifying circuit), a water turbine configured to generate a DC power, or other unipolar power source.

The inverter 106 is electrically connected to the DC source 104 and configured to convert a DC waveform generated by the DC source 104 to an AC waveform suitable for delivery to the AC grid 102 and, in some embodiments, loads coupled to the AC grid 102. The AC grid 102 may be embodied as, for example, a utility power grid that supplies utility AC power to residential and commercial users. Such utility power grids may be characterized as having an essentially sinusoidal bipolar voltage at a fixed grid frequency (e.g., $f=\omega)/2\pi=50$ Hz or 60 Hz).

Figure 2:
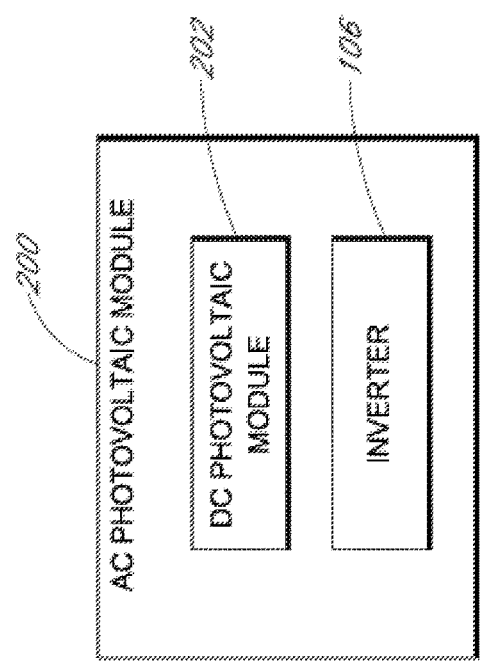
FIG. 2 is a simplified block diagram of an AC photovoltaic module of the system of FIG. 1.

As discussed above, in some embodiments, the DC source 104 may be embodied as one or more photovoltaic cells. In such embodiments, the DC source 104 and the inverter 106 may be associated with each other to embody an AC photovoltaic module (ACPV) 200, as illustrated in FIG. 2. The ACPV 200 includes a DC photovoltaic module (DCPV) 202, which operates as the DC source 104, electrically coupled to the inverter 106. The DCPV 202 includes one or more photovoltaic cells and is configured to deliver a DC waveform to the inverter 106 in response to receiving an amount of sunlight. The DC power delivered by the ACPV 200 is a function of environmental variables, such as, e.g., sunlight intensity, sunlight angle of incidence and temperature. In some embodiments, the inverter 106 is positioned in a housing of the ACPV 200. Alternatively, the inverter 106 may include its own housing secured to the housing of the ACPV 200. Additionally, in some embodiments, the inverter 106 is separate from the housing, but located near the DCPV 202. As discussed above, the inverter 106 is configured to convert the DC power received from the DCPV 202 to an AC power suitable for delivery to the AC grid 102 at the grid frequency. It should be appreciated that multiple ACPVs 200 may be used to form a solar array with each ACPV 200 having a dedicated inverter 106.

Figure 3:
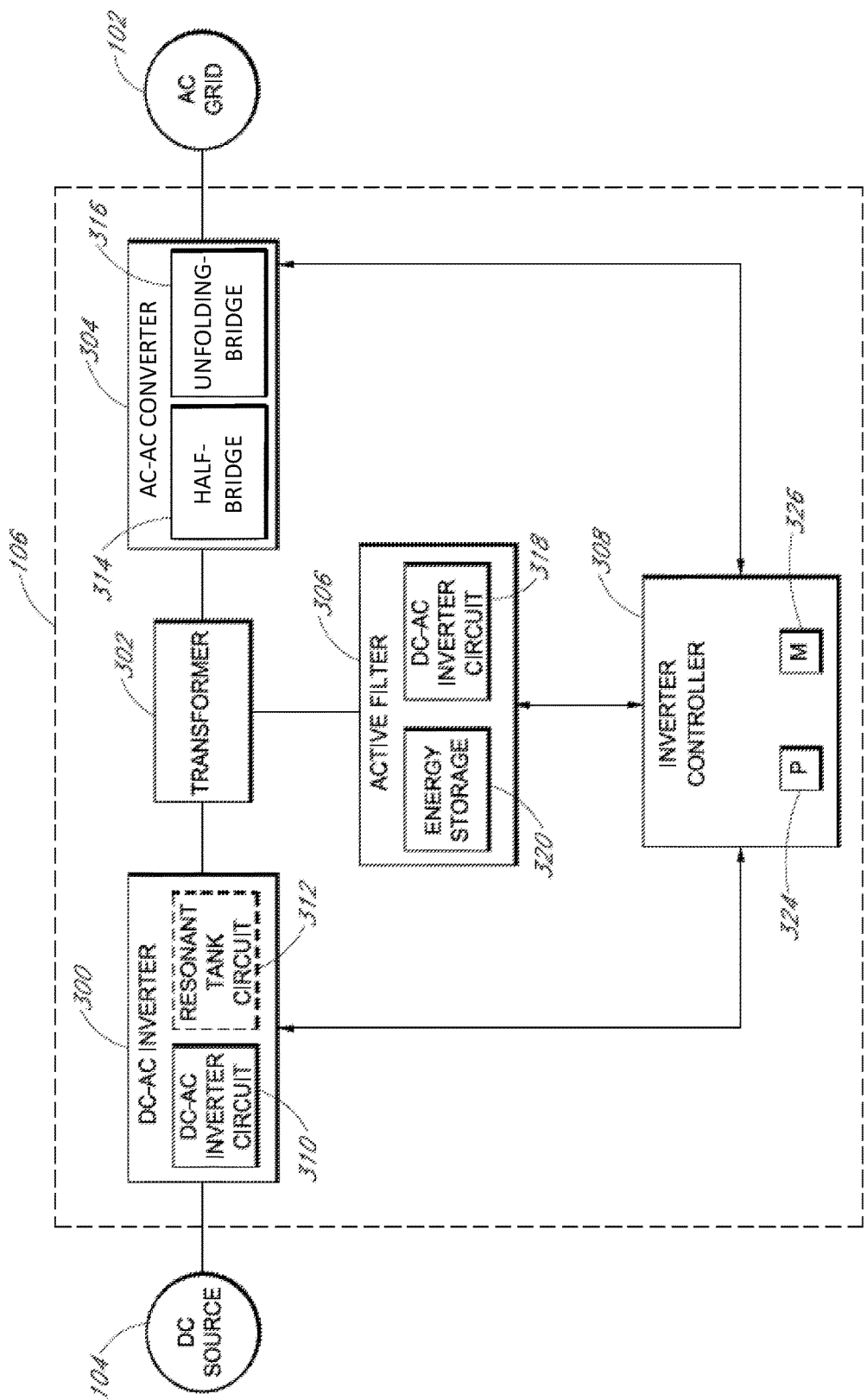
FIG. 3 is a simplified block diagram of an inverter of the system of FIG. 1 or as may otherwise be employed in embodiments.

Referring now to FIG. 3, in some embodiments, the inverter 106 includes a DC-AC inverter 300, a transformer 302, a AC-AC converter 304, and an active filter 306. Depending on the particular embodiment, the transformer 302 may be embodied as a three-winding transformer that includes a first winding, a second winding, and a third winding or a two-winding transformer that includes a first winding and a second winding (see, for example, FIGS. 4-5). Although the transformer 302 may be described herein as a two-winding transformer or a three-winding transformer, it should be appreciated that such transformers may include more than two or three windings, respectively, in some embodiments. For example, in various embodiments, a three-winding transformer may include three windings, four windings, five windings, or a greater number of windings.

The DC-AC inverter 300 is electrically coupled to the first winding (not shown) of the transformer 302 and is electrically couplable to the DC source 104. As shown in FIG. 3, the DC-AC inverter 300 includes a DC-AC inverter circuit 310 and, in some embodiments, may include a resonant tank circuit 312 or a portion thereof. The DC-AC inverter circuit 310 is adapted to convert an input DC waveform from the DC source 14 to an AC waveform delivered to the transformer 302 at the first winding. In some embodiments, the resonant tank circuit 312 includes a capacitor and an inductor. It should be appreciated that, in some embodiments, the resonant tank circuit 312 may be formed by one or more discrete capacitors (e.g., a capacitor divider) and a leakage inductance of the transformer 302 (e.g., in half-bridge inverter embodiments).

The AC-AC converter 304 is electrically coupled to the second winding (not shown) of the transformer 302 and electrically couplable to the AC grid 102. As shown in FIG. 3, the AC-AC converter 304 includes a half-bridge circuit 314 and an unfolding bridge circuit 316. The AC-AC converter circuit 304 is adapted to convert an AC waveform received at the second winding of the transformer 302 to the output AC waveform delivered to the AC grid 102 and having the same frequency as a waveform of the AC grid 102 (i.e., the grid frequency). That is, the AC-AC converter 304 is configured to convert an input AC waveform to an output AC waveform having a frequency that is different from the input AC waveform.

Figure 4:
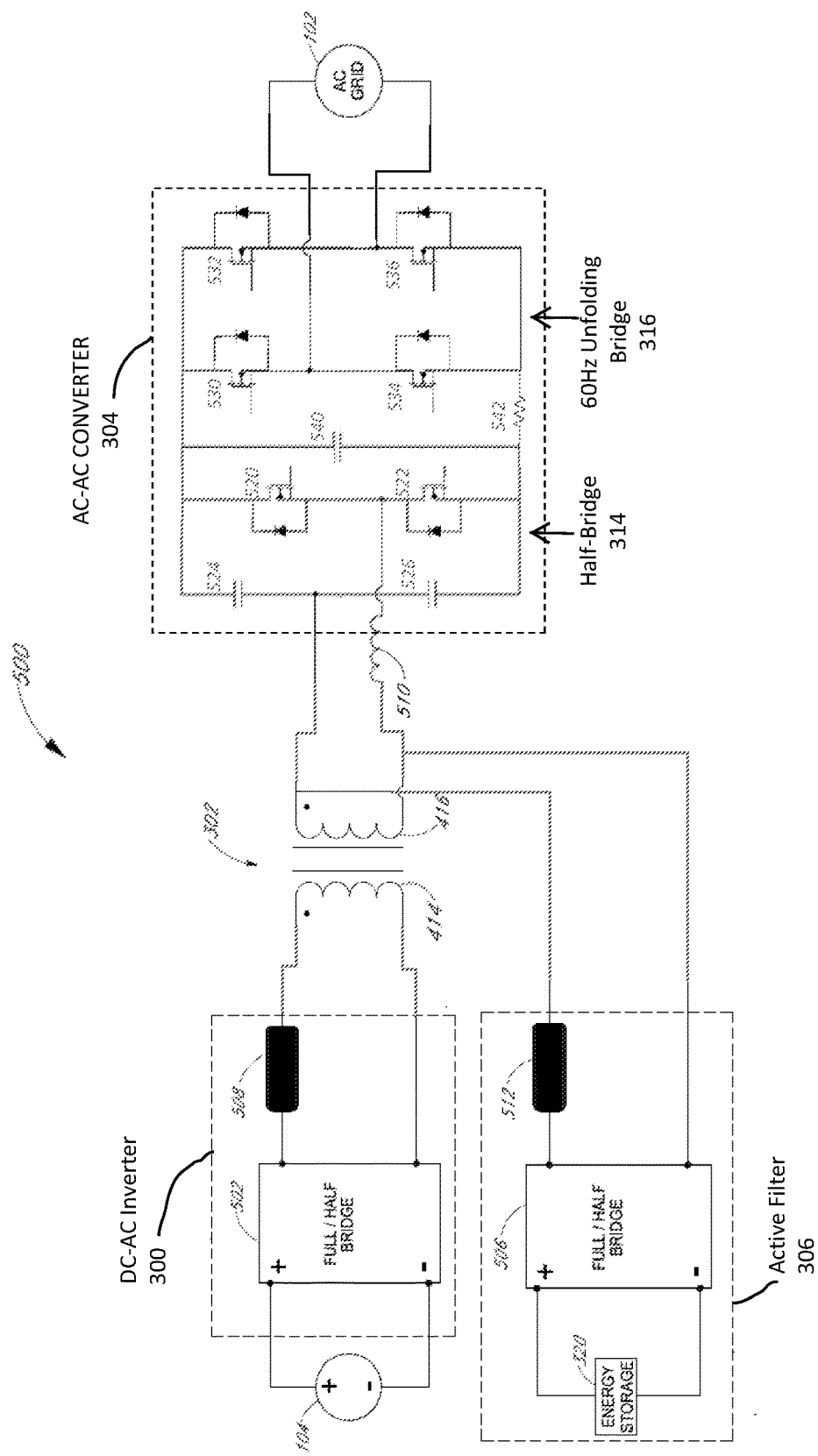
FIG. 4 is a simplified electrical schematic of an embodiment of the inverter of FIG. 3 or as may otherwise be employed in embodiments.
Figure 5:
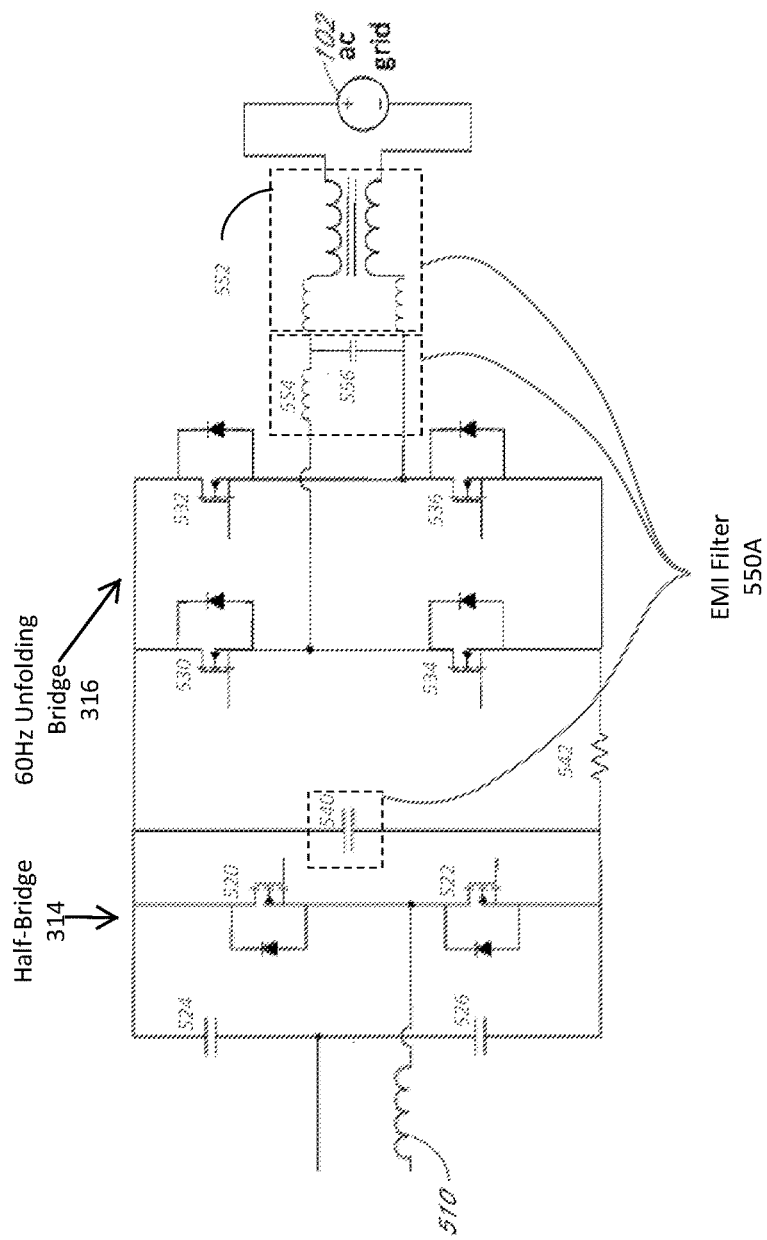
FIG. 5 is a simplified electrical schematic of the AC-AC converter of FIG. 3 or as may otherwise be employed in embodiments.

Depending on the particular embodiment, the active filter 306 may be coupled to the first winding, the second winding, or the third winding (not shown) of the transformer 302. For example, in embodiments in which the transformer 302 is embodied as a three-winding transformer, the active filter 306 may be electrically coupled to the third winding of the transformer 302, whereas in embodiments in which the transformer 302 is embodied as a two-winding transformer, the active filter 306 may be electrically coupled to the first winding or, as illustrated in FIG. 4, the second winding of the transformer 302. The active filter 306 is adapted to sink and source power with one or more energy storage devices 320 of the active filter 306 and using a DC-AC inverter circuit 318 based on a mismatch in power (e.g., an instantaneous mismatch in power) between the DC source 104 and the AC grid 102. That is, the active filter 306 supplies power from or absorbs power with the one or more energy storage devices 320 based on the mismatch in power.

For example, it should be appreciated that the DC source 104 delivers a relatively constant power to the DC-AC inverter 300. However, the AC grid 102 has a relatively sinusoidal power that fluctuates (e.g., between zero and peak power). When the power of the AC grid 102 is zero, the power delivered to the AC grid 102 should also be zero; accordingly, the constant power delivered by the DC source 104 is supplied to the one or more energy storage devices 320 of the active filter 306. However, when the AC grid 102 is at peak power, the power of the AC grid 102 is generally twice that of the input power from the DC source 104; as such, all of the power from the DC source 104 is delivered to the AC grid 102 and the other half of the power is supplied from the one or more energy storage devices 320 of the active filter 306. In some embodiments, the one or more energy storage devices 320 are embodied as one or more capacitors; however, the energy storage devices 320 may be embodied as other devices in other embodiments.

The inverter 106 also includes an inverter controller 308, which controls the operation of the DC-AC inverter 300, the AC-AC converter 304, and the active filter 306. Although the inverter controller 308 is illustratively embodied as a single controller in the embodiment of FIG. 3, the inverter controller 308 may be embodied as multiple separate controllers in other embodiments. For example, in some embodiments, the inverter 106 may include an input controller to control the operation of the DC-AC inverter 300, an output controller to control the operation of the AC-AC converter 304, and/or a filter controller to control the operation of the active filter 306. In such embodiments, each of the controllers may be galvanically isolated from one another.

As discussed above, the inverter controller 308 is electrically coupled to and adapted to control operation of the DC-AC inverter 300, the AC-AC converter 304, and the active filter 306. To do so, the inverter controller 308 may provide a plurality of switching and/or control signals to various circuits of the DC-AC inverter 300, the AC-AC converter 304, and the active filter 306. For example, in some embodiments, the inverter controller 308 controls the operation of the DC-AC inverter 300 based on a global maximum power point tracking ("MPPT") method. As shown in FIG. 3, the illustrative inverter controller 308 utilizes an algorithm to control various switches of the inverter 106. To do so, the inverter controller 308 may provide a plurality of switching and/or control signals to various circuits of the inverter 106. In embodiments, such signals may be repeated duty cycle signals, e.g. 50% duty cycle signals, for each of the three ports of the inverter 106, with a small blanking time and appropriate phases shifts between duty cycles at each port. It should be appreciated that, in some embodiments, the inverter controller 308 is adapted to control switching cycles of the various electrical switches of the DC-AC inverter 300, the AC-AC converter 304, and/or the active filter 306 using zero-voltage switching techniques.

The inverter controller 308 may include a processor 324 and a memory 326, both of which may be integrated into a single integrated circuit or as separate integrated circuits connected via wires on a printed circuit board. The processor 324 may execute instructions stored on the memory 326 and cause the inverter controller 308 to perform various actions to control the DC-AC inverter 300, the AC-AC converter 304, and/or the active filter 306. The memory 326 may be any of a number of known tangible storage mediums (e.g., RAM, DRAM, SRAM, ROM, EEPROM, Flash memory, etc.).

Additionally, in some embodiments, the inverter 106 may include circuits not shown herein for clarity of the description. For example, the inverter 106 may include communication circuitry, which may be communicatively coupled to the inverter controller 308 or may be incorporated therein. In such embodiments, the inverter controller 308 may utilize the communication circuitry to communicate with remote devices, such as remote controllers or servers. For example, depending on the particular embodiment, the communication circuitry may be configured to communicate with remote devices over an AC power line, such as the AC power line interconnects coupled to the output of the AC-AC converter 304, or using other communication technologies and/or protocols. For example, in some embodiments, the communication circuitry may be embodied as a wireless or wired communication circuit configured to communicate with remote devices utilizing one or more wireless or wired communication technologies and/or protocols such as Wi-Fi™, Zigbee®, ModBus®, WiMAX, Wireless USB, Bluetooth®, TCP/IP, USB, CAN-bus, HomePNA™, and/or other wired or wireless communication technology and/or protocol. Further, in some embodiments, the inverter 106 may include an input filter electrically coupled (e.g., in series) with the DC source 104 and/or an output filter electrically coupled (e.g., in series) with the AC grid 102.

Referring now to FIG. 4, a multi-port resonant converter topology in which the inverter 106 is embodied as a three-port inverter 500, and includes a two-winding transformer 302, is shown. The illustrative inverter 500 of FIG. 4 includes a set of full and/or half bridge converter circuits 502, 506, a set of impedances 508, 510, 512, the half-bridge circuit 314, and the unfolding bridge circuit 316. As shown, in the illustrative embodiment, the converter circuit 502 and the impedance 508 form the DC-AC inverter 300, the half-bridge circuit 314, the impedance 510, and the unfolding bridge 316 form the AC-AC converter 304, and the converter circuit 506, the impedance 512, and the energy storage device 320 form the active filter 306. As shown and described above, the DC-AC inverter 300 is electrically coupled to the first winding 414 of the transformer 302 and the AC-AC converter 304 and the active filter 306 are electrically coupled to the second winding 416 of the transformer 302. It should be appreciated that two-winding transformer 302 topologies may reduce the complexity and, therefore, cost associated with manufacturing the transformer 302 compared to three-winding transformer topologies. In other embodiments, the DC-AC inverter 300 and the active filter 306 may be electrically coupled to the first winding 414 and the AC-AC converter 304 may be electrically coupled to the second winding 416. In embodiments, the transformer may have three windings with the DC-AC inverter 300 electrically coupled to the first winding, the AC-AC converter 304 electrically coupled to the second winding, the active filter 306 electrically coupled to the third winding.

The converter circuit 502 may be embodied as the DC-AC inverter circuit 310 and, depending on the particular embodiment, may be embodied as a half-bridge inverter circuit or a full-bridge inverter circuit. Similarly, the converter circuit 506 is embodied as the DC-AC inverter circuit 318, which depending on the particular embodiment, may be embodied as a half-bridge inverter circuit or a full-bridge inverter circuit. The illustrative AC-AC converter circuit 304 is embodied as the half-bridge circuit 314 and unfolding bridge circuit 316. The impedance 508 may be representative of leakage inductances from the two-winding transformer 302. The impedance 512 may be representative of the impedance of a trace on the printed circuit board on which the inverter 106 is assembled. The impedance 510 may comprise a discrete component of the AC-AC converter 304.

As shown in FIG. 4, the half-bridge 314 of the AC-AC converter 304 includes electrical switches 520, 522, a capacitor divider comprising capacitors 524, 526, and an inductor 510. The unfolding bridge 316 of the AC-AC converter 304 includes electrical switches 530, 532, 534, 536. The AC-AC converter 304 also includes a capacitor 540 and a resistor 542. The resistor 542 senses the current of the AC grid to permit the current to be regulated.

More specifically, first terminals of the electrical switches 520, 522 are electrically coupled to one another and to a first terminal of the inductor 510. The second terminal of the inductor 510 is electrically coupled to the second winding 416 of the transformer 302. A first terminal of the capacitor 524 is electrically coupled to a first terminal of the capacitor 526 and to the second terminal of the second winding 416 of the transformer 302. The second terminal of the capacitor 524 is electrically coupled to the second terminal of the electrical switch 520 and the second terminal of the capacitor 526 is electrically coupled to the second terminal of the electrical switch 522.

The unfolding bridge 316 of the AC-AC converter 304 is electrically coupled to the AC grid 102. More specifically, first terminals of each of a first pair of the electrical switches 530, 532 are electrically coupled to each other, to the second terminal of the switch 520 and to the second terminal of the capacitor 524. Similarly, first terminals of each of a second pair of the electrical switches 534, 536 are electrically coupled to each other, to the second terminal of the switch 522 and to a first terminal of the resistor 542. Second terminals of the switches 530, 534 are electrically coupled to each other and to one side of the AC grid 102. Second terminals of the electrical switches 532, 536 are electrically coupled to each other and to the other side of the AC grid 102.

A first terminal of the capacitor 540 is electrically coupled to the second terminal of the switch 520. The second terminal of the capacitor 540 is electrically coupled to a second terminal of the resistor 542 and to the second terminal of the switch 522.

In embodiments, the AC-AC converter 304 may also include an EMI filter. The EMI filter may include the two inductors and the common mode inductor, collectively identified in FIGS. 5 and 6 by the dashed box 552 and electrically coupled between the unfolding bridge 316 and the AC grid 102, and the capacitor 540, electrically coupled between the half-bridge 314 and the unfolding bridge 316. In one embodiment, illustrated in FIG. 5, the EMI filter 550A is comprises additional components electrically coupled between the unfolding bridge 316 and the AC grid 102 including an inductor 554, electrically coupled between the second terminals of the switches 530, 534 and one side of the AC grid 102 and a capacitor 556 electrically coupled across the components 552.

Figure 6:
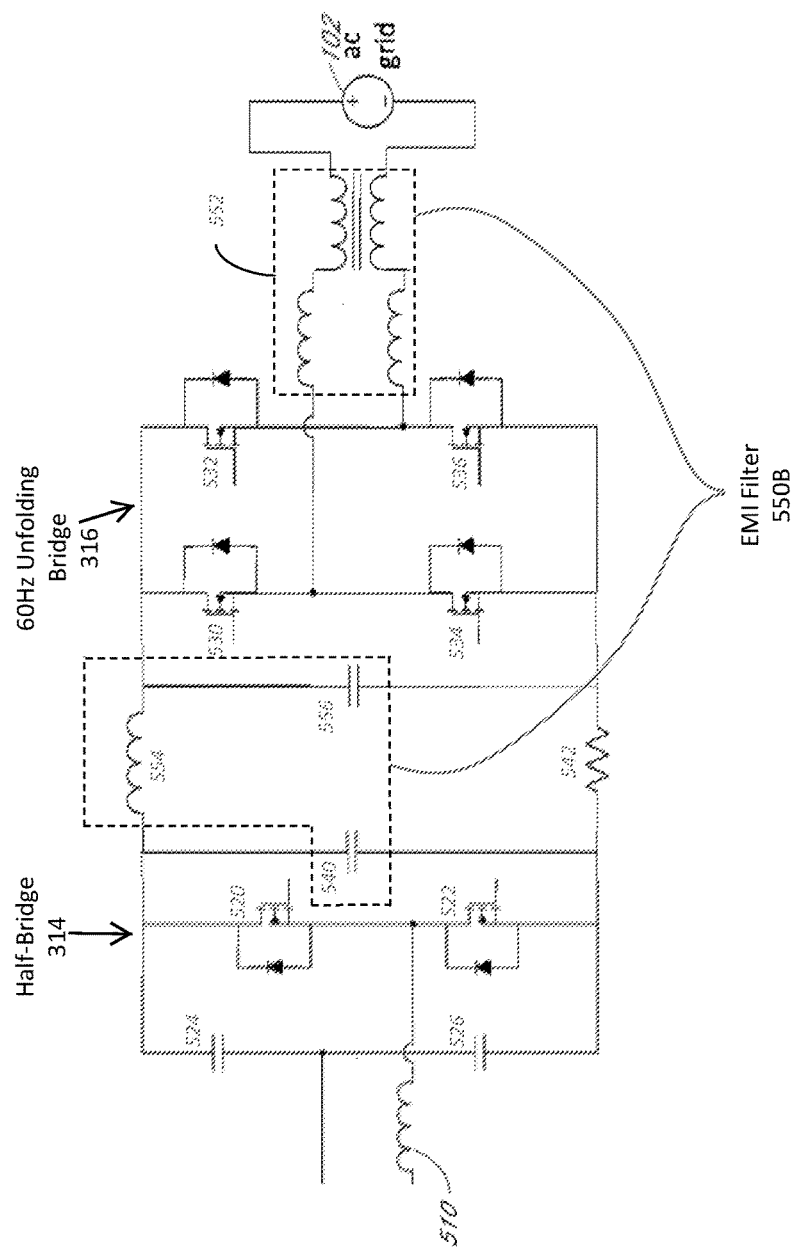
FIG. 6 is a simplified electrical schematic of available topologies of the AC-AC converter of FIG. 3 or as may otherwise be employed in embodiments.

FIG. 6 shows that embodiments may have the EMI filter 550 comprising additional components electrically coupled between the half-bridge 314 and the unfolding bridge 316. In such topologies, the inductor 554 may be electrically coupled between the second terminal of the switch 520 and the first terminal of the switch 530 and the capacitor 556 may be electrically coupled between the first terminals of the switches 530, 534.

Each of the electrical switches described herein is a MOSFET in the illustrative embodiments; however, other types of transistors or electrical switches may be used in other embodiments. In some MOSFETs, the source metallization may connect N and P doped regions on the top of the FET structure, forming a diode between the drain and the source of the MOSFET, which is represented as body diodes for each of the corresponding electrical switches. It should be appreciated that, in some embodiments, the inverter 106 may utilize one or more other types of transistors (e.g., bipolar junction transistors (BJT), insulated-gate bipolar transistors (IGBT), GaN (gallium nitride), etc.) or thyristors.

Figure 7:
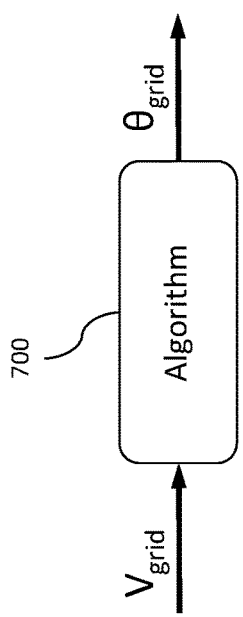
FIG. 7 illustrates a module configured for estimating the grid phase angle from grid voltage as may be employed in embodiments.
Figure 8B:
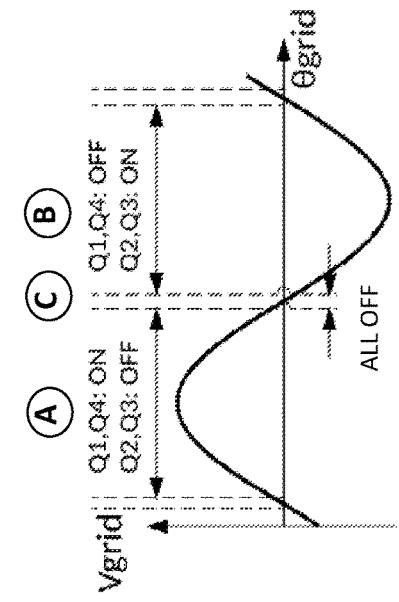
FIG. 8B is a representative plot of the grid voltage relative to the grid phase angle illustrating the timing of pairs of switches as they are turned on and off as may be employed in embodiments.
Figure 8A:
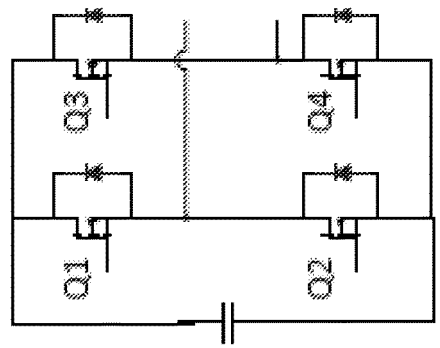
FIG. 8A is a simplified electrical schematic identifying the four switches in an unfolding bridge that may be used in the inverter of the system of FIG. 1 as well as other embodiments.

Turning to FIG. 7, the gate signals used to control the electrical switches 530, 532, 534, 536 unfolding bridge 316 of the AC-AC converter 304 are based on the grid phase angle of the AC grid 102. The controller 308 receives the AC voltage $V_{grid}$ and the processor 324 executes an algorithm 700 stored in the memory 326 to estimate the grid phase angle $\Theta_{grid}$. FIG. 8A is a simplified electrical schematic diagram of the four electrical switches 530, 534, 532, 536 (now labeled Q1-Q4, respectively) in the unfolding bridge 316. As illustrated in the plot of FIG. 8B, representing the grid phase angle $\Theta_{grid}$ relative to the grid voltage $V_{grid}$ as estimated by the algorithm 700, the diagonally opposite electrical switches Q1, Q4 are turned on and diagonally opposite electrical switches Q2, Q3 are turned off when the grid voltage $V_{grid}$ has risen above approximately the zero-crossing and is positive (period 'A'). Conversely, the electrical switches Q1, Q4 are turned off and the electrical switches Q2, Q3 are turned on when the grid voltage $V_{grid}$ has fallen below approximately the zero-crossing and is negative (period 'B'). Because the derivation of the grid phase angle $\Theta_{grid}$ may be approximate, the control signal may impose a brief blanking time period between the first and second periods during which all four electrical switches Q1-Q4 are off (period 'C'). In this way, a negative voltage across the half-bridge 314 may be prevented.

Figure 9:
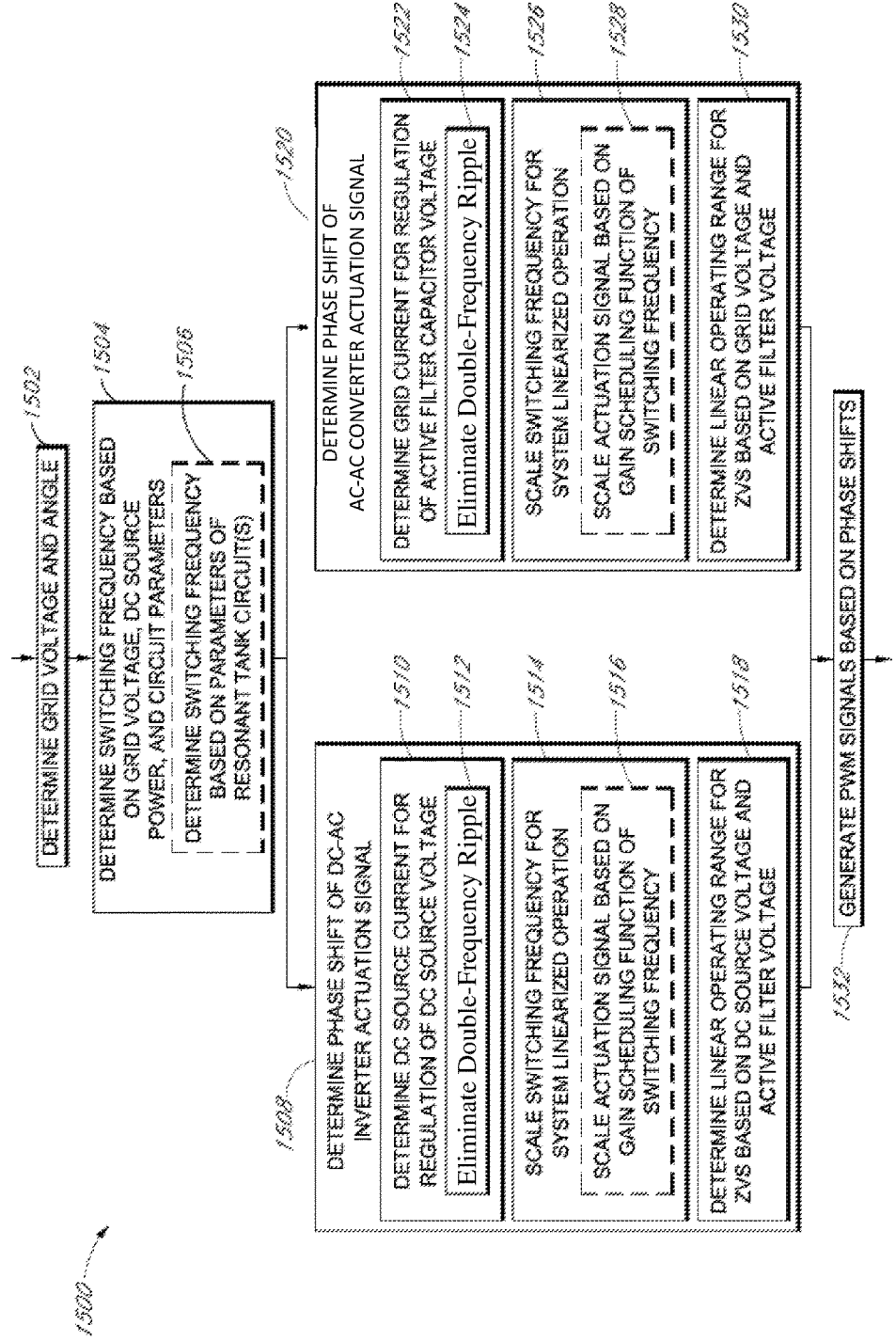
FIG. 9 is a simplified flow diagram of an embodiment of a method for controlling the inverter of FIG. 1 or may otherwise be employed in embodiments.

Referring now to FIG. 9, in some embodiments, the inverter controller 308 may execute a method 1500 for closed-loop control of the inverter 106. The method begins with block 1502 in which the inverter controller 308 determines the grid voltage $V_{grid}$ of the AC grid 102 and estimates the angle ($\theta_e$) of the grid voltage. As described above, the controller 308 may utilize a PLL or other suitable angle estimator to do so. In block 1504, the controller 108 determines the switching frequency of the electrical switches of the inverter 106 based on the grid voltage (e.g., the instantaneous grid voltage) and/or other circuit parameters. For example, the switching frequency may be determined based on the input power of the DC source 104, component values of various components of the inverter 106 (e.g., component inductances and/or capacitances), and/or operating values of the inverter 106 (e.g., voltages and/or currents at various points in the inverter 106). For example, in block 1506, the controller 108 may determine the switching frequency based on the parameters of one or more of the resonant tank circuits of the inverter 106 (e.g., inductance and capacitance values).

In block 1508, the controller 108 determines a phase shift of the actuation signal ($\theta_1$) for the electrical switches of the DC-AC inverter 300 relative to the actuation signal (e.g., $\theta_3=0$) for the electrical switches of the active filter 306. To do so, in block 1510, the controller 108 may determine the DC source current for regulation of the DC source voltage of the DC source 104 (e.g., PV panel) based on a suitable MPPT technique. Further, in block 1512, the controller 108 may eliminate double-frequency ripple from the AC grid 102. In block 1514, the controller 108 may scale the switching frequency for system linearized operation as described above. In particular, in block 1516, the controller 108 may scale the actuation signal of the DC-AC inverter 300 based on a gain scheduling function of switching frequency. In block 1518, the controller 108 may determine a linear operating range for zero-voltage switching based on the DC source voltage and the active filter voltage.

In block 1520, the controller 108 determines a phase shift of the actuation signal ($\theta_2$) for the electrical switches of the AC-AC converter 304 relative to the actuation signal for the electrical switches of the active filter 306. To do so, in block 1522, the controller 108 may determine the grid current of the AC grid 102 for regulation of the active filter capacitor voltage (e.g., across the energy storage device 320) of the active filter 306. Further, in block 1524, the controller 108 may eliminate double-frequency ripple from the AC grid 102. In block 1526, the controller 108 may scale the switching frequency for system linearized operation as described above. In particular, in block 1528, the controller 108 may scale the actuation signal of the AC-AC converter 304 based on a gain scheduling function of switching frequency. In block 1530, the controller 108 may determine a linear operating range for zero-voltage switching based on the grid voltage and the active filter voltage. It should be appreciated that, in some embodiments, the blocks 1508 and 1520 may be performed in parallel.

In block 1532, the controller 108 generates a set of signals for actuation of the electrical switches of the inverter 106 based on the determined phase shifts $\theta_1$ and $\theta_2$. In particular, the controller 108 may generate a signal for actuation of the electrical switches of the DC-AC inverter 300, a signal for actuation of the electrical switches of the AC-AC converter 304, and a signal for actuation of the electrical switches of the active filter 306. The signals may preferably provide 50% duty cycles and vary the phase shifts among the ports of the inverter 106 and the switching frequency, thereby controlling the power flow. These duty cycles may also be set for other percentages, vary within a margin of error from 50% or other target percentage, and have duty cycle ranges or targets for both certain instantaneous conditions and over short or long periods of time for actuating the switches of the DC-AC inverter 300, the switches of the AC-AC converter 304, and the switches of the active filter 306.

In embodiments the inverter controller 108 or other modules or components may utilize various other techniques to control operations of inverter 106. For example, in some embodiments, the controller 108 may utilize an alternative mode of operation for controlling the electrical switches of the inverter 106. That is, in normal operation, all three ports of the inverter 106 (i.e., the DC-AC inverter 300, the AC-AC converter 304, and the active filter 306) receive signals to actuate the corresponding electrical switches of those components. However, during the alternative mode of operation, the inverter controller 108 may disable the signal transmission to one of the ports (i.e., the DC-AC inverter 300, the AC-AC converter 304, or the active filter 306), which results in lower switching losses. In particular, in some embodiments, the signal transmission to the port may be disabled every other switching period, which may reduce the number of switching instances of that port by fifty percent. For example, in some embodiments, the signals supplied to the active filter 306 may be disabled every other switching period.

There is a plurality of advantages of the present disclosure arising from the various features of the apparatuses, circuits, and methods described herein. It will be noted that alternative embodiments of the apparatuses, circuits, and methods of the present disclosure may not include all of the features described yet still benefit from at least some of the advantages of such features. Those of ordinary skill in the art may readily devise their own implementations of the apparatuses, circuits, and methods that incorporate one or more of the features of the present disclosure and fall within the spirit and scope of the present invention as defined by the appended claims.

What is claimed is:

1. A multi-port inverter for converting an input direct current (DC) waveform from a DC source to an output alternating current (AC) waveform for delivery to an AC grid, the inverter comprising:
   a transformer;
   a DC-AC inverter electrically coupled to a first winding of the transformer, wherein the DC-AC inverter is adapted to convert the input DC waveform to an AC waveform delivered to the transformer at the first winding;

an AC-AC converter electrically coupled to a second winding of the transformer, wherein the AC-AC converter is adapted to convert an AC waveform received at the second winding of the transformer to the output AC waveform having a grid frequency of the AC grid, the AC-AC converter comprising:
  a first set of electrical switches electrically coupled to a first terminal of the second winding of the transformer;
  a capacitor divider electrically coupled with the first set of electrical switches and to a second terminal of the second winding of the transformer;
  a second set of electrical switches electrically coupled to the AC grid;
  a first capacitor electrically coupled across the first set of electrical switches; and
  a sensor electrically coupled between the first capacitor and the second set of electrical switches, the sensor sensing an AC grid current; and an active filter coupled to a winding of the transformer, wherein the active filter is adapted to sink and source power with one or more energy storage devices based on a mismatch in power between the DC source and the AC grid.

2. The inverter of claim 1, wherein:
the first set of electrical switches comprises a half-bridge circuit; and
the second set of electrical switches comprises an unfolding bridge circuit.

3. The inverter of claim 2, wherein:
the capacitor divider comprises second and third capacitors having first terminals electrically coupled at a first node to a first terminal of the second winding of the transformer;
the half-bridge circuit comprises:
  a first electrical switch having a first terminal electrically coupled at a second node to a second terminal of the second capacitor and a second terminal electrically coupled at a third node to a first terminal of a first inductor, the second terminal of the inductor electrically coupled to the second terminal of the second winding of the transformer; and
  a second electrical switch having a first terminal electrically coupled at a fourth node to a second terminal of the third capacitor and a second terminal electrically coupled at the third node to the first terminal of the inductor;
the first capacitor is electrically coupled between the second and fourth nodes; and
the unfolding bridge circuit comprises:
  a first pair of series-coupled electrical switches electrically coupled to each other at a fifth node; and
  a second pair of series-coupled electrical switches electrically coupled to each other at a sixth node, the first pair and second pair electrically coupled in parallel at the seventh node and at an eighth node, and the eighth node electrically coupled to the second node;
a resistor is electrically coupled between the fourth node and seventh nodes, and
the fifth and sixth nodes are electrically coupled to first and second terminals, respectively, of the AC grid.

4. The inverter of claim 1, further comprising an EMI filter having components electrically coupled between the unfolding bridge circuit and the AC grid.

5. The inverter of claim 1, further comprising an EMI filter having components electrically coupled between the half-bridge circuit and the unfolding bridge circuit.

6. The inverter of claim 1, wherein the one or more energy storage devices consists of a capacitor and wherein the sensor is a sensing resistor.

7. The inverter of claim 1, wherein the DC source comprises a photovoltaic module.

8. The inverter of claim 1, further comprising a controller having a processor and a memory comprising a plurality of instructions stored thereon and executable by the processor, wherein:
the second set of switches comprises an unfolding bridge circuit comprising first, second, third, and fourth electrical switches; and
in response to execution by the processor, the plurality of instructions cause the inverter to control the switching cycles of the second set of switches, whereby:
  when a voltage across the AC grid is substantially positive during a first period, the first and fourth electrical switches are on and the second and third electrical switches are off;
  when the voltage across the AC grid is substantially negative during a second period, the first and fourth electrical switches are off and the second and third electrical switches are on; and
  during a third period comprising a blanking time period between the first and second periods when the voltage across the AC grid is approximately zero, the first, second, third, and fourth electrical switches are off.

9. A multi-port inverter for converting an input direct current (DC) waveform from a DC source to an output alternating current (AC) waveform for delivery to an AC grid, the inverter comprising:
an AC-AC converter electrically coupled through a transformer to a DC-AC inverter electrically coupled to the DC source, the AC-AC converter comprising:
  a half-bridge circuit electrically coupled to a winding of the transformer; and
  an unfolding bridge circuit electrically coupled between the half-bridge circuit and the AC grid;
  wherein the AC-AC converter is adapted to convert an AC waveform received from the transformer to output the AC waveform having a grid frequency of the AC grid; and
a controller having a processor and a memory wherein the controller is adapted to control switching cycles of electrical switches of the unfolding bridge circuit, whereby:
  when a voltage across the AC grid is substantially positive during a first period, a first set of electrical switches is on and a second set of electrical switches is off;
  when the voltage across the AC grid is substantially negative during a second period, the first set of electrical switches is off and the second set of electrical switches is on; and
  during a third period comprising a blanking time period between the first and second periods when a voltage across the AC grid is approximately zero, the first and second, sets of electrical switches are off.

10. The inverter of claim 9, further comprising an EMI filter having components electrically coupled between the unfolding bridge circuit and the AC grid.

11. The inverter of claim 9, further comprising an EMI filter having components electrically coupled between the half-bridge circuit and the unfolding bridge circuit.

12. A multi-port inverter for converting an input direct current (DC) waveform from a DC source to an output alternating current (AC) waveform for delivery to an AC grid, the inverter comprising:
a transformer;
a DC-AC inverter electrically coupled to a first winding of the transformer, wherein the DC-AC inverter is adapted to convert the input DC waveform to an AC waveform delivered to the transformer at the first winding;
an AC-AC converter electrically coupled to a second winding of the transformer and adapted to convert the AC waveform received at the second winding of the transformer to the output AC waveform having a grid frequency of the AC grid, the AC-AC converter comprising:
  a half-bridge circuit electrically coupled to the first winding of the transformer; and
  an unfolding bridge circuit electrically coupled between the half-bridge circuit and the AC grid;
an active filter electrically coupled to a winding of the transformer wherein the active filter is adapted to sink and source power with one or more energy storage devices based on a mismatch in power between the DC source and the AC grid; and
a controller electrically coupled to receive an AC voltage from the AC grid and having an output signal comprising an estimate of a phase angle of the AC voltage, wherein the controller, in response to the estimated phase angle of the AC voltage, controls switching cycles of a plurality of electrical switches of the AC-AC converter.

13. The inverter of claim 12, wherein:
the unfolding bridge circuit comprises first, second, third, and fourth electrical switches; and
in response to the estimated phase angle of the AC voltage, the controller controls the switching cycles of the first, second, third, and fourth electrical switches, whereby:
  when a voltage across the AC grid is substantially positive during a first period, the first and fourth electrical switches are on and the second and third electrical switches are off;
  when the voltage across the AC grid is substantially negative during a second period, the first and fourth electrical switches are off and the second and third electrical switches are on; and
  during a third period comprising a blanking time period between the first and second periods when the voltage across the AC grid is approximately zero, the first, second, third, and fourth electrical switches are off.

14. The inverter of claim 12, further comprising an electromagnetic interference (EMI) filter electrically coupled between the unfolding bridge circuit and the AC grid circuit.

15. The inverter of claim 12, further comprising an electromagnetic interference (EMI) filter electrically coupled between the half-bridge circuit and the unfolding bridge circuit.

16. The inverter of claim 12, wherein the DC source comprises a photovoltaic module.

17. A method for controlling operation of electrical switches of an unfolding bridge in an inverter configured to convert an input direct current (DC) waveform from a DC source to an output alternating current (AC) waveform for delivery to an AC grid, wherein the inverter comprises a transformer and a DC-AC inverter electrically coupled to the transformer, an active filter electrically coupled to the transformer, and an AC-AC converter, wherein the AC-AC converter comprises a half-bridge circuit electrically coupled to the transformer and an unfolding bridge circuit electrically coupled between the half-bridge circuit and the AC grid, the method comprising the steps of:
determining a phase of an AC grid voltage; and
generating a set of signals for actuation of electrical switches of the unfolding bridge circuit based on the determined phase, whereby:
  when a voltage across the AC grid is positive during a first period, first and fourth electrical switches are on and second and third electrical switches are off;
  when the voltage across the AC grid is negative during a second period, the first and fourth electrical switches are off and the second and third electrical switches are on; and
  during a third period comprising a blanking time period between the first and second periods when the voltage across the AC grid is approximately zero, the first, second, third, and fourth electrical switches are off.

18. The method of claim 17, wherein the determining and generating steps are performed in a controller electrically coupled to the AC-AC converter by one or more processors executing instructions stored in memory.

19. The method of claim 17 further comprising:
providing an active filter electrically coupled to a winding of the transformer wherein the active filter is adapted to sink and source power with one or more energy storage devices based on a mismatch in power between the DC source and the AC grid.

20. The method of claim 18 wherein the one or more processors generates the set signals for actuation of the electrical switches based on multiple determined phase shifts of the AC grid voltage.

* * * * *